United States Patent [19]

Kato

[11] Patent Number: 4,841,210

[45] Date of Patent: Jun. 20, 1989

[54] INDUSTRIAL ROBOT CONTROL DEVICE

[75] Inventor: Hisao Kato, Aichi, Japan

[73] Assignee: Mitsubishi Denki Kabushiki Kaisha, Tokyo, Japan

[21] Appl. No.: 156,130

[22] Filed: Feb. 16, 1988

[30] Foreign Application Priority Data

Feb. 16, 1987 [JP] Japan .................................. 52-32698

[51] Int. Cl.[4] ............................................ G05B 19/42
[52] U.S. Cl. .......................... 318/568.24; 318/568.11; 318/632; 364/513; 219/125.1; 901/20; 901/22
[58] Field of Search .......... 318/568 R, 568 D, 568 G, 318/568 H, 568 C, 561, 562, 563, 564, 565, 566, 567, 569, 570, 571, 572, 573, 574, 575, 576, 577, 599, 601-618, 625, 445, 431, 430, 568 L; 219/124.34, 125.1; 364/513, 478, 472, 473, 470, 471; 361/181, 90, 91; 901/19, 20, 21, 22, 23, 24

[56] References Cited

U.S. PATENT DOCUMENTS

| | | | |
|---|---|---|---|
| 4,308,584 | 12/1981 | Arai | 364/513 |
| 4,467,436 | 8/1984 | Chance et al. | 364/513 |
| 4,475,160 | 10/1984 | Inaba | 364/513 |
| 4,481,591 | 11/1984 | Spongh | 364/513 |
| 4,503,507 | 3/1985 | Takeda et al. | 318/568 G X |
| 4,697,979 | 10/1987 | Nakashima et al. | 364/513 X |

Primary Examiner—William M. Shoop, Jr.
Assistant Examiner—Paul Ip
Attorney, Agent, or Firm—Sughrue, Mion, Zinn, Macpeak & Seas

[57] ABSTRACT

An industrial robot control device for use in an automobile manufacturing line for instance. The control device is capable of preventing incorrect or improper operations of the machines due to a voltage drop in a power source which occurs when the plurality of machines including the industrial robots are driven simultaneously.

6 Claims, 2 Drawing Sheets

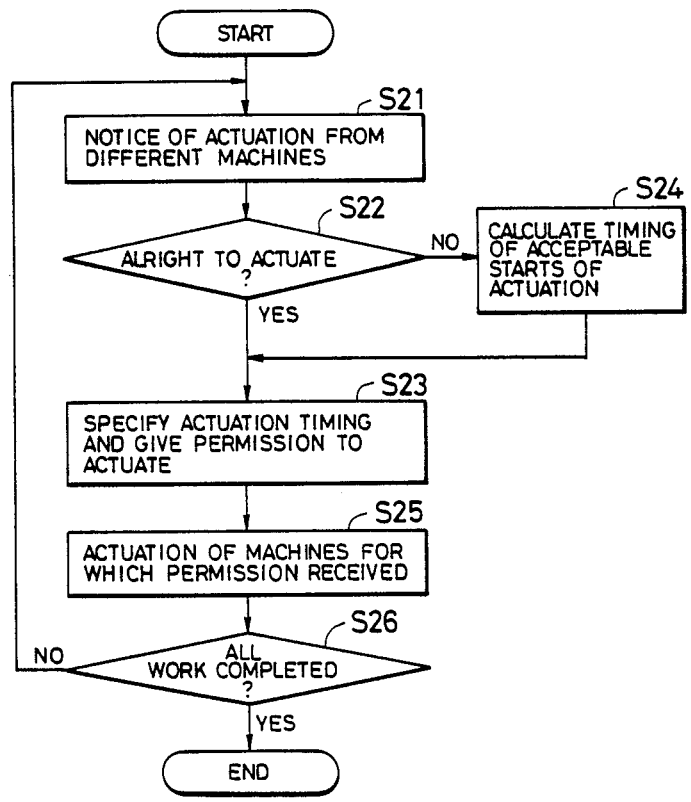

INDUSTRIAL ROBOT CONTROL DEVICE

BACKGROUND OF THE INVENTION

The present invention relates to an industrial robot control device for controlling a number of machines provided in a single production line. More particularly, the invention relates to an industrial robot control device for use in an automobile manufacturing line for instance, which is capable of preventing incorrect or improper operations of the machines due to a voltage drop in a power source which occurs when the plurality of machines including the industrial robots are driven simultaneously.

Recently, there has been an increasing number of situations in which a large number of industrial robots are installed in a single production line. In an automobile welding and assembling line, for example, there is provided a large number of robots having spot welding guns and a large amount of power is needed for such spot welding operations and robot drive control.

Therefore, when the various machines in the line are driven simultaneously, there may occur a risk of imperfect welding or incorrect robot operations due to a temporary drop in the power supply voltage.

This can be avoided by the provision of equipment which has a power supply capacity such that the supply voltage drop will not go below a prescribed value even if all the machines are actuated simultaneously. But such equipments are disadvantageous of being uneconomic.

As described above, the prior art device is disadvantageous of imperfect welding or of incorrect robot operations if all the machines on a line are actuated simultaneously since, from considerations of economy, it has been proposed to install a power supply equipment having a capacity less than that required for driving all the machines in the line.

SUMMARY OF THE INVENTION

In view of the above, it is an object of the present invention to eliminate drawbacks accompanying the prior art device as described above, and a further object of the present invention is to provide a control device capable of controlling a number of machines such as robots, welding machines and the like in a single production line so that undesired voltage drop in a power supply is eliminated to thereby perform operations of the machines perfectly.

The above, and other objects of the present invention are accomplished by the provision of a control device for controlling a plurality of machines including industrial robots, which are provided in a single production line comprising means for producing a prior notice of actuation for each of said machines a predetermined period of time before the actuation of each of said machines; means for calculating a total amount of voltage drops caused by the actuations of said machines to which the prior notices of actuation have been issued; means for detecting whether the total amount of voltage drops is lower a predetermined allowable value; means for determining drive order and drive timing of said machines according to priorities which have been given to said machines, respectively, when it is detected by said determining means that the total amount of voltage drops exceeds the predetermined allowable value; and means for driving said machines according to outputs of said determining means.

With such a control device of the invention, there is no occurrence of undesired voltage drop above a limit at which welding is imperfect or robots function incorrectly since the number of machines actuated simultaneously is restricted if the voltage drop is above a prescribed value.

BRIEF DESCRIPTION OF THE DRAWINGS

In the accompanying drawings, FIGS. 1 (a) and (b) are block diagrams showing the main configuration and partial details of one embodiment of the invention, respectively and FIG. 2 is a flowchart of an operation thereof.

DESCRIPTION OF THE PREFERRED EMBODIMENT

Figure 1A:
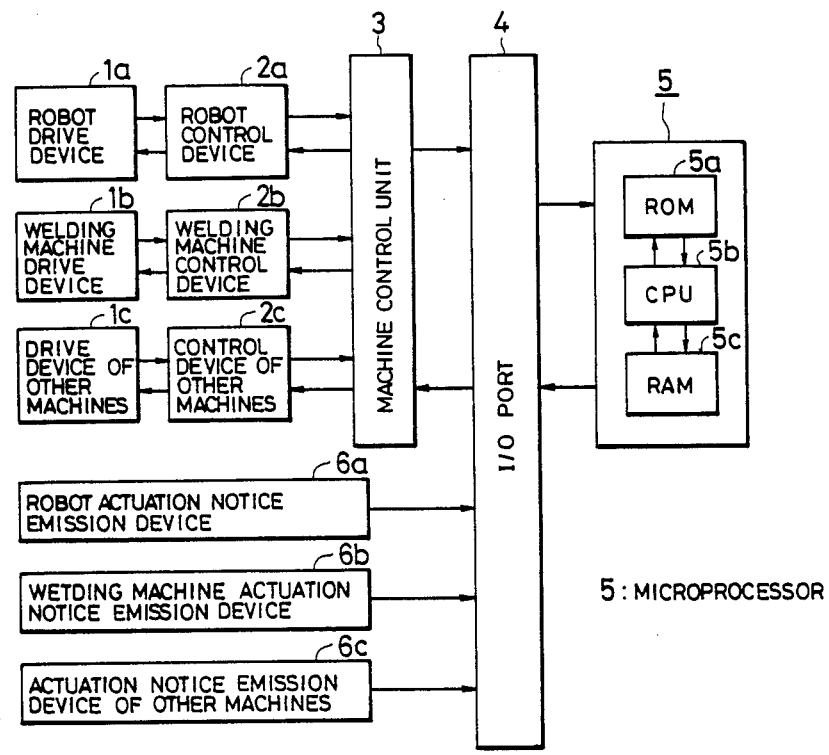
Figure 1B:
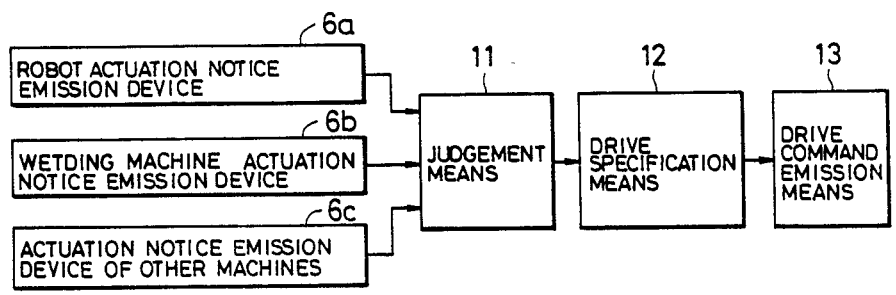

An embodiment of the invention will now be described with reference to the drawings. FIGS. 1 (a) and 1(b) are a block diagram and a partial detail block diagram of the control device of the present invention. In the figures, 1a, 1b and 1c designate drive units for driving robots, welding machines and other machines that are installed in a single production line and 2a, 2b and 2c designate control units for controlling the drive units 1a, 1b and 1c, respectively. The arrangement is such that drive commands are supplied to the various machines in accordance with set timings via a machine control unit 3.

4 denotes an I/O port; 5, a microprocessor and 6a, 6b and 6c, actuation notice producing devices for the robots, welding machines and other machines, which refer to the present conditions of robots and actuation signals of various types of contacts indicating the presence or absence of a workpiece and conveyor positions etc., and which produce prior notices of actuation of their respective units a set time beforehand. The voltage drops in the various machines, the voltage drop period of time, the permissible voltage drop for a power source and priority rankings, etc. and also the drive programs for each machine are stored in memory means ROM 5a and RAM 5c of the microprocessor 5 in advance and a CPU 5b operates to determine the timing of the actuation of the machines with reference to the notices of actuation and the memory contents so as to bring the voltage drop in the power source within a predetermined value. The CPU 5b then produces an output representing the determination result to the machine control unit 3.

More specifically, as shown in FIG. 1 (b), there is provided a judgement means 11 which calculates a total amount of voltage drops caused by actuations of the machines to which the prior notices of actuation have already been given, and which judges whether or not it is lower than a predetermined allowable value, a drive control means 12 which specifies drive order and timing in accordance with a priority ranking for the machines and a drive instruction producing means 13 which sends drive instructions to the machines which are to be actuated. The drive control means 12 delays the timing of start of actuation for the machine having lower priority when the voltage drop exceeds the predetermined allowable value.

Next, the operation will be described with reference to the flowchart of FIG. 2. First, the notices of actuation that are produced by the actuation notice producing devices 6a to 6c a predetermined period of time beforehand are received (step S21), the total amount of voltage drops in the machines to which the notices have already been issued is calculated and the judgement means 11 operate to judge whether or not the total amount thereof, that is the voltage drop in the power source, is within the predetermined allowable range (step S22). If it is within the range, the drive control means 12 and the drive instruction producing means 13 sets the actuation timing for the machines and give permission to actuate them (step 23). If the total amount of the voltage drop exceeds the predetermined allowable value, the start timing of actuation of the machines having lower priorities that are relatively low in working are selectively delayed by the drive control means 12 so as to bring the total amount of the voltage drops to be within the predetermined allowable range (step S24) and permission to actuate is obtained in the next timing period. This procedure continues until all the work is completed (steps S25, S26).

As is apparent from the above description, according to the invention, the number of machines driven simultaneously is restricted if the total amount of voltage drops exceeds a predetermined allowable value in a single production line, and therefore imperfect operation in welding or incorrect robot operation can be avoided.

What is claimed is:

1. A control device for controlling a plurality of machines including industrial robots, which are provided in a single production line comprising:

means for producing a prior notice of actuation for each of said machines a predetermined period of time before the actuation of each of said machines;
   means for calculating a total amount of voltage drops caused by the actuations of said machines to which the prior notices of actuation have been issued;
   means for detecting whether the total amount of voltage drops is lower than a predetermined allowable value;
   means for determining drive order and drive timing of said machines according to priorities which have been given to said machines, respectively, when it is detected by said determining means that the total amount of voltage drops exceeds the predetermined allowable value; and
   means for driving said machines according to outputs of said determining means.

2. The device as defined in claim 1 wherein said production line is an assembling line for automobiles.

3. The device as defined in claim 1 wherein said machines comprises industrial robots, welding machines and a conveying means.

4. The device as defined in claim 1 wherein the priority ranking are given to said machines according to the working amount thereof, respectively.

5. The device as defined in claim 4 wherein said determining means determines the drive timing of said machines according to the priority ranking thereof, respectively.

6. The device as defined in claim 5 wherein said determining means delays the drive timing of said machine having the lower priority.

* * * * *